US012717491B2

(12) United States Patent
Luo et al.

(10) Patent No.: US 12,717,491 B2
(45) Date of Patent: Aug. 25, 2026

(54) MEMORY CONTROLLER, SYSTEM, OPERATING METHOD, AND ELECTRONIC DEVICE WITH IMPROVED OVER PROVISIONING (OP)

(71) Applicant: Yangtze Memory Technologies Co., Ltd., Wuhan (CN)

(72) Inventors: Xianwu Luo, Wuhan (CN); Jin Cai, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 470 days.

(21) Appl. No.: 18/091,177

(22) Filed: Dec. 29, 2022

(65) Prior Publication Data

US 2024/0176499 A1 May 30, 2024

(30) Foreign Application Priority Data

Nov. 24, 2022 (CN) ........................ 202211485235.5

(51) Int. Cl.
*G06F 3/06* (2006.01)
*G06F 11/1446* (2026.01)

(52) U.S. Cl.
CPC .......... *G06F 3/0616* (2013.01); *G06F 3/0653* (2013.01); *G06F 3/0659* (2013.01); *G06F 3/0679* (2013.01); *G06F 11/1458* (2013.01); *G06F 11/1451* (2013.01)

(58) Field of Classification Search
CPC .... G06F 3/0616; G06F 3/0653; G06F 3/0659; G06F 3/0679; G06F 11/1451; G06F 11/1458
USPC .......................................................... 711/103
See application file for complete search history.

(56) References Cited

U.S. PATENT DOCUMENTS

| | | | | |
|---|---|---|---|---|
| 10,430,279 | B1 * | 10/2019 | Dittia | G06F 3/0656 |
| 10,474,527 | B1 * | 11/2019 | Sun | G06F 11/1068 |
| 10,915,400 | B1 * | 2/2021 | Muchherla | G06F 9/5022 |
| 2006/0282627 | A1 * | 12/2006 | Aggarwal | G06F 3/0644 711/154 |
| 2009/0077329 | A1 * | 3/2009 | Wood | G06F 12/0815 711/E12.001 |
| 2010/0293331 | A1 * | 11/2010 | Fujii | G06F 12/0866 711/119 |
| 2010/0325351 | A1 * | 12/2010 | Bennett | G06F 12/0246 711/170 |
| 2012/0124294 | A1 * | 5/2012 | Atkisson | G06F 12/0804 711/135 |
| 2014/0281064 | A1 * | 9/2014 | Imazaki | G06F 3/0665 710/74 |
| 2017/0123972 | A1 * | 5/2017 | Gopinath | G06F 3/0616 |

(Continued)

*Primary Examiner* — Reginald G Bragdon
*Assistant Examiner* — Aaron D Ho
(74) *Attorney, Agent, or Firm* — Oblon, McClelland, Maier & Neustadt, L.L.P.

(57) ABSTRACT

Disclosed in the present application are an operating method for a memory controller, a memory controller, a system, and an electronic device. The operating method can include, when detecting that remaining capacity of a used backup area in the memory is less than capacity required for redundancy check data to be written, determining a backup area to be used from the memory, determining valid redundancy check data belonging to garbage collection in the used backup area, and backing up the valid redundancy check data into the backup area to be used, and erasing the used backup area.

20 Claims, 7 Drawing Sheets

(56) References Cited

U.S. PATENT DOCUMENTS

| | | | | |
|---|---|---|---|---|
| 2018/0129600 | A1* | 5/2018 | Ishiyama | G06F 11/1076 |
| 2018/0267720 | A1* | 9/2018 | Goldberg | G06F 3/0679 |
| 2018/0351582 | A1* | 12/2018 | Canepa | G06F 12/0246 |
| 2019/0067322 | A1* | 2/2019 | Chen | H01L 21/76877 |
| 2019/0129810 | A1* | 5/2019 | Kushwah | G06F 11/1453 |
| 2019/0354452 | A1* | 11/2019 | Mehra | G06F 11/10 |
| 2020/0042230 | A1* | 2/2020 | Li | G06F 3/0655 |
| 2020/0042243 | A1* | 2/2020 | Lee | G06F 3/064 |
| 2021/0233585 | A1* | 7/2021 | Vigilante | G11C 14/0018 |
| 2021/0334031 | A1* | 10/2021 | Grayson | G06F 3/0614 |
| 2023/0176759 | A1* | 6/2023 | Park | G11C 16/349<br>711/154 |
| 2023/0273877 | A1* | 8/2023 | Shatsky | G06F 3/0604 |

* cited by examiner

MEMORY CONTROLLER, SYSTEM, OPERATING METHOD, AND ELECTRONIC DEVICE WITH IMPROVED OVER PROVISIONING (OP)

CROSS-REFERENCE OF RELATED APPLICATIONS

The present application claims the benefit of priority to China Application No. 202211485235.5, filed on Nov. 24, 2022, the content of which is incorporated herein by reference in its entirety.

BACKGROUND

Technical Field

The present disclosure relates to the field of data storage technologies, and in particular to an operating method for a memory controller, a memory controller, a system, and an electronic device.

Description of the Related Art

Before some operations are performed in a memory system, some volatile data in a memory controller included in the memory system needs to be backed up for use in subsequent data reconstruction. In currently-used data backup modes, over provisioning (OP) of a memory system is relatively low, affecting the performance and service life of the memory system.

SUMMARY

In view of this, implementations of the present disclosure provide an operating method for a memory controller, a memory controller, a system, and an electronic device, so as to resolve the foregoing problem.

According to a first aspect, the implementations of the present disclosure provide an operating method for a memory controller. The memory controller is coupled with one or more memories. The operating method can include determining a backup area to be used from the memory when detecting that remaining capacity of a used backup area in the memory is less than capacity required for redundancy check data to be written, determining valid redundancy check data belonging to garbage collection in the used backup area, and backing up the valid redundancy check data into the backup area to be used, and erasing the used backup area.

According to a second aspect, the implementations of the present disclosure provide a memory controller. The memory controller is coupled with one or more memories. The memory controller includes a processor, where the processor is configured to determine a backup area to be used from the memory when detecting that remaining capacity of a used backup area in the memory is less than capacity required for redundancy check data to be written; determine valid redundancy check data belonging to garbage collection in the used backup area; and back up the valid redundancy check data into the backup area to be used, and erase the used backup area.

According to a third aspect, the implementations of the present disclosure further provide a memory system, including one or more memories, the one or more memories including a memory array and a memory controller coupled with the memory and configured to control the memory. The memory controller includes a processor. The processor is configured to determine a backup area to be used from the memory array when detecting that remaining capacity of a used backup area in the memory array is less than capacity required for redundancy check data to be written, determine valid redundancy check data belonging to garbage collection in the used backup area, and back up the valid redundancy check data into the backup area to be used, and erase the used backup area.

According to a fourth aspect, the implementations of the present application further provide an electronic device, including a memory system, the memory system including one or more memories, the one or more memories including a memory array, and a memory controller coupled with the one or more memories and configured to control the memory, and a host coupled with the memory system. The memory controller includes a front end interface coupled with the host, a processor, a check cache, and a back end interface coupled with the memory. The processor is configured to determine a backup area to be used from the memory array when detecting that remaining capacity of a used backup area in the memory array is less than capacity required for redundancy check data to be written; determine valid redundancy check data belonging to garbage collection in the used backup area; back up the valid redundancy check data into the backup area to be used, and erase the used backup area; and set a set backup flag bit to a first flag. The host is configured to send a backup command to the memory controller. The processor is further configured to: receive the backup command through the front end interface, check the backup flag bit in response to the backup command; perform a backup operation on redundancy check data in the check cache based on a backup mode determined by the backup flag bit, during backup, sequentially generate a set of write commands, and send the set of write commands to the memory through the back end interface, and the one or more memories are further configured to: back up the redundancy check data in the check cache to the backup area to be used in response to the set of write commands, where the redundancy check data includes redundancy check data belonging to garbage collection and/or redundancy check data generated from a write command of the host coupled with the memory controller.

The implementations of the present disclosure provide an operating method for a memory controller, a memory controller, a system, and an electronic device. The operating method includes, when detecting that remaining capacity of a used backup area in the memory is less than capacity required for redundancy check data to be written, determining a backup area to be used from the memory, determining valid redundancy check data belonging to garbage collection in the used backup area, and back up the valid redundancy check data into the backup area to be used, and erase the used backup area. In the operating method provided in the implementations of the present disclosure, when a new backup area to be used is created, valid redundancy check data belonging to garbage collection in a used backup area is backed up to the backup area to be used, and the backup area that has been used is erased. In such a backup area management mode, the number of blocks allocated to a system pool in a memory can be appropriately reduced, and the number of blocks allocated to a user data pool is increased, so that the OP of the memory can be increased, thereby improving the performance and service life of a memory system.

BRIEF DESCRIPTION OF THE DRAWINGS

Various implementations of this disclosure that are proposed as examples will be described in detail with reference to the following figures, wherein like numerals reference like elements, and wherein.

DETAILED DESCRIPTION OF THE PREFERRED IMPLEMENTATIONS

Figure 1:
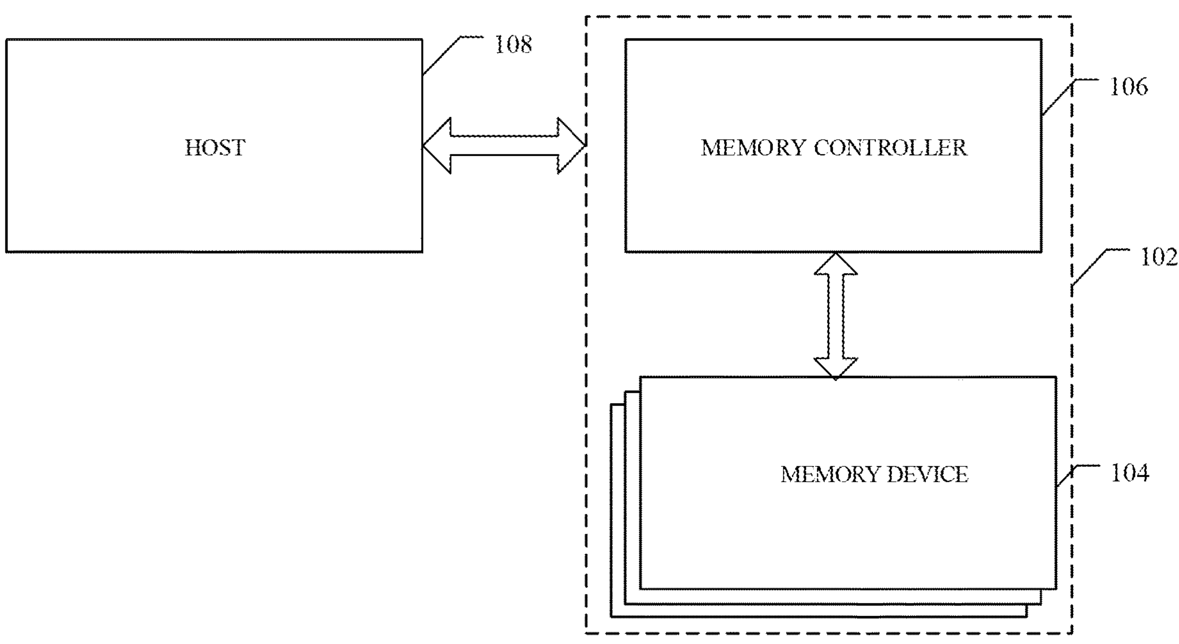
FIG. 1 is a schematic diagram of a system with a memory system.

Implementations disclosed in the present disclosure will be described in more detail below with reference to the accompanying drawings. The implementations of the present disclosure are shown in the accompanying drawings, however, it should be understood that the present disclosure may be implemented in various forms, and should not be limited to the specific implementations set forth herein. Rather, these implementations are provided so that the present disclosure can be understood more thoroughly, and can fully convey the scope disclosed in the present disclosure to a person skilled in the art.

In the description below, a large number of specific details are given to provide more thorough understanding of the present disclosure. However, it will be apparent to those skilled in the art that the present disclosure can be implemented without one or more of these details. In other examples, to avoid confusion with the present disclosure, some technical features that are well known in the art are not described; that is, all features of actual implementations are not described here, and functions and structures that are well known are not described in detail.

In the accompanying drawings, dimensions of layers, regions, and elements, as well as their relative dimensions, may be exaggerated for clarity. The same reference numerals from beginning to end indicate the same components.

It should be understood that when an element or layer is referred to as being "on", "adjacent to", "connected to", or "coupled to" another element or layer, it may be directly on, adjacent to, connected to, or coupled to the other element or layer or an intervening element or layer may be present. In contrast, when an element is referred to as being "directly on", "directly adjacent to", "directly connected to", or "directly coupled to" another element or layer, no intervening element or layer is present. It should be understood that, although the terms first, second, third or the like may be used to describe various elements, components, regions, layers, and/or portions, these elements, components, regions, layers, and/or portions should not be limited by these terms. These terms are only used to distinguish one element, component, region, layer, or portion from another element, component, region, layer, or portion. Therefore, a first element, component, region, layer or portion discussed below may be denoted as a second element, component, region, layer, or portion without departing from the teaching of the present disclosure. When a second element, component, region, layer, or portion is discussed, it does not indicate that a first element, component, region, layer, or portion is necessarily present in the present disclosure.

Spatially relative terms, such as "beneath", "below", "lower", "under", "above", "upper", and the like, may be used herein for ease of description to describe one element or feature's relationship to another element or feature as illustrated in the figures. It should be understood that the spatially relative terms are intended to encompass different orientations of a device in use or operation in addition to an orientation depicted in the figures. For example, if a device in the figures is turned over, an element or a feature described as being "below". "beneath" or "under" another element or feature would then be oriented "above" the other element or feature. Therefore, the term "below" and "beneath" can encompass orientations "up" and "down" both. The device may be otherwise oriented (rotated 90 degrees or at other orientations) and the spatially relative descriptors used herein are interpreted accordingly.

The terms used herein are intended to describe specific implementations only and are not intended as a limitation to the present application. As used herein, the singular forms "a," "an", and "the" are intended to include the plural forms as well, unless the context clearly indicates otherwise. It should also be understood that the terms "comprising" and/or "including", when used in the specification, identify the presence of the features, integers, steps, operations, elements and/or components, but do not exclude the presence or addition of one or more other features, integers, steps, operations, elements, components and/or groups. As used herein, the term "and/or" includes any and all combinations of the associated listed items.

To understand the features and technical content of implementations of the present application in more detail, the implementation of the implementations of the present application is described below in detail with reference to the accompanying drawings. The accompanying drawings are used for illustrative purposes only and are not intended to limit the implementations of the present disclosure.

FIG. 1 is a block diagram of an electronic device with a memory system. In FIG. 1, the electronic device 100 may be a mobile phone, a desktop computer, a laptop computer, a tablet computer, a vehicle computer, a game console, a printer, a pointing device, a wearable electronic device, a smart sensor, a virtual reality (VR) device, an augmented reality (AR) device or any other suitable electronic device with a memory therein. As shown in FIG. 1, the electronic device 100 may include a host 108 and a memory system 102, where the memory system 102 has one or more memories 104 and a memory controller 106; and the host 108 may be a processor (e.g., a central processing unit (CPU) or a system on a chip (SoC)) of the electronic device, where the system on a chip may be, for example, an application processor (AP). The host 108 may be configured to send data to the memory device 104 through the memory controller 106 or receive data from the memory device 104 through the memory controller 106. Specifically, the memory device 104 may be any memory disclosed in the present application, for example, a phase change random access memory (PCRAM), a three-dimensional NAND flash memory, or the like.

According to some implementations, the memory controller 106 is coupled to the memory device 104 and the host 108, and is configured to control the memory device 104.

The memory controller 106 may manage data stored in the memory device 104 and communicate with the host 108. In some implementations, the memory controller 106 is designed for operating in a low duty-cycle environment such as a secure digital (SD) card, a compact flash (CF) card, a universal serial bus (USB) flash drive, or other media for use in electronic devices with a low duty-cycle environment such as personal computers, digital cameras, mobile phones, and the like. In some implementations, the memory controller 106 is designed for operating in a high duty-cycle environment such as a solid state drive (SSD) or an embedded multi-media-card (eMMC), which is used as a data store for mobile devices with a high duty-cycle environment such as smartphones, tablet computers, laptop computers or the like, and an enterprise memory array. The memory controller 106 may be configured to control operations of the memory device 104 such as read, erase, and programming operations.

In some implementations, the memory controller 106 may also be configured to manage various functions with respect to data stored or to be stored in the memory device 104, where the functions include, but not limited to, bad-block management, garbage collection, logical-to-physical address conversion, wear leveling, etc. In some implementations, the memory controller 106 is further configured to process error correction codes (ECCs) with respect to data read from the memory device 104 or written to the memory device 104. In some implementations, any other suitable functions may be performed by the memory controller 106 as well, for example, formatting the memory device 104. The memory controller 106 may communicate with an external device (e.g., the host 108) according to a particular communication protocol. For example, the memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc. These interfaces may also be referred to as front end interfaces. In some implementations, the memory controller 106 exchanges commands/data with the memory device 104 through a plurality of configured channels. These channels are also referred to as back end interfaces.

Figure 2:
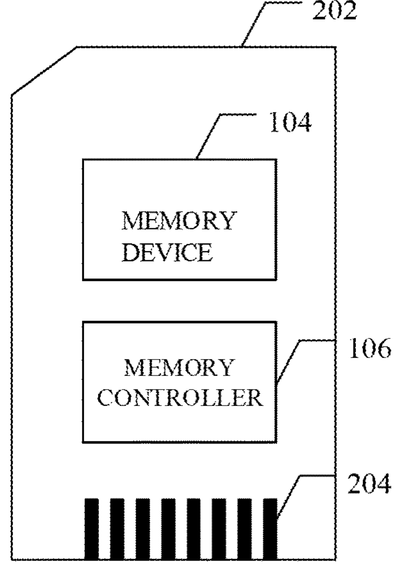
FIG. 2 is a schematic diagram of a memory card with a memory.

In some implementations, the memory controller 106 and the one or more memories 104 may be integrated into various types of memory devices, for example, be included in the same package, such as a universal flash storage (UFS) package or an eMMC package. That is, the memory system 102 may be implemented and packaged into different types of end electronic products. In one example shown in FIG. 2, the memory controller 106 and a single memory device 104 may be integrated into a memory card 202. The memory card may include a PC card (PCMCIA, personal computer memory card international association), a CF card, a smart media (SM) card, a memory stick, a multimedia card (MMC. RS-MMC, MMCmicro), an SD card (SD, miniSD, microSD, SDHC), a UFS, etc. The memory card may further include a memory card connector 204 configured to couple the memory card to a host (e.g., the host 108 in FIG. 1).

Figure 3:
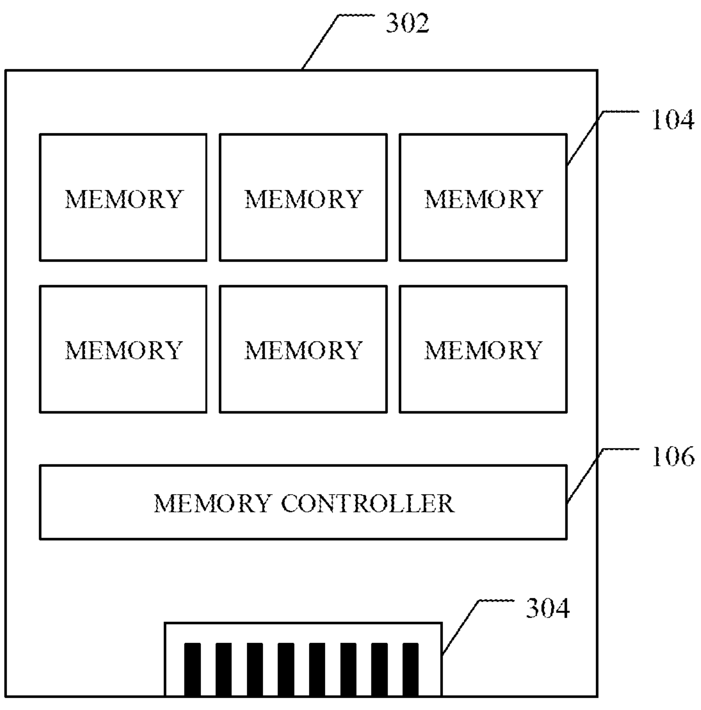
FIG. 3 is a schematic diagram of a solid state drive (SSD) with a memory.

In another example shown in FIG. 3, the memory controller 106 and a plurality of memories 104 may be integrated into an SSD 302. The SSD may further include an SSD connector 304 configured to couple the SSD to a host (e.g., the host 108 in FIG. 1). In some implementations, the storage capacity and/or the operation speed of the SSD is greater than those of the memory card.

Figure 4:
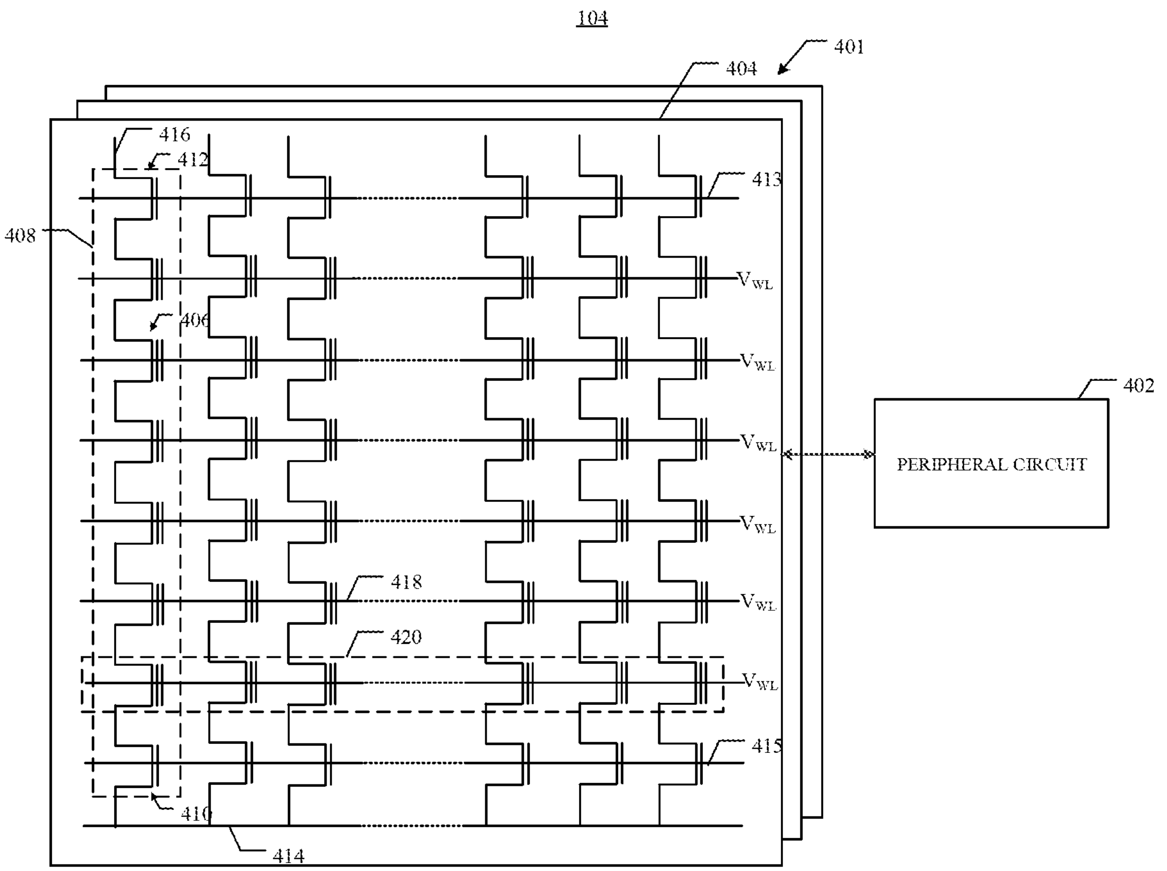
FIG. 4 is a diagram of a memory including a peripheral circuit.

In some implementations, the structure of the memory device 104 may be an memory including a peripheral circuit as shown in FIG. 4. As shown in FIG. 4, the memory device 104 may include a memory array 401 and a peripheral circuit 402 coupled to the memory array 401. The memory array 401 may be a NAND flash memory array, where memory cells 406 are provided in an array of NAND memory strings 408. Each NAND memory string 408 extends vertically above a substrate (not shown). In some implementations, each NAND memory string 408 includes a plurality of memory cells 406 coupled in series and stacked vertically. Each memory cell 406 may hold a continuous, analog value, such as a voltage or charge, that depends on the number of electrons trapped within a memory area of the memory cell 406. Each memory cell 406 may be either a floating gate type of memory cell including a floating-gate transistor or a charge trap type of memory cell including a charge trap transistor.

In some implementations, each memory cell 406 is a single-level cell (SLC) that has two possible data states and thus that may store one bit of data. For example, a first data state "0" may correspond to a first range of voltages, and a second data state "1" may correspond to a second range of voltages. In some implementations, the first range of voltages and the second range of voltages may be referred to as a threshold voltage distribution of the memory cell. In some implementations, each memory cell 406 is a multi-level cell (MLC) that has more than four data states and stores multiple bits of data. For example, the MLC may store two bits per memory cell, three bits per memory cell (also known as a trinary level cell (TLC)), four bits per memory cell (also known as a quadruple level cell (QLC)), or the like. The data states of any type of memory cell include an erased state and a programmed state. In some implementations, when a programming operation is performed on a memory cell, the memory cell in an erased state is programmed to a programmed state. Generally, a voltage value in a voltage range corresponding to the programmed state of the memory cell is relatively large.

As shown in FIG. 4, each NAND memory string 408 may also include a source select gate (SSG) 410 at its source terminal and a drain select gate (DSG) 412 at its drain terminal.

The SSG 410 and the DSG 412 may be configured to activate a selected NAND memory string 408 (a column of the array) during read and programming (or write) operations. In some implementations, the sources of the NAND memory strings 408 in the same block 404 are coupled through a same source line (SL) 414 (e.g., a common SL). In other words, according to some implementations, all NAND memory strings 408 in the same block 404 have an array common source (ACS). According to some implementations, the DSG 412 of each NAND memory string 408 is coupled to a corresponding bit line 416, and data may be read or written from the bit line 416 via an output bus (not shown). In some implementations, each NAND memory string 408 is configured to be selected or deselected by applying a select voltage (for example, greater than a threshold voltage of a transistor with the DSG 412) or an deselect voltage (for example, 0 volts (V)) to the corresponding DSG 412 through one or more DSG lines 413 and/or by applying a select voltage (for example, greater than a threshold voltage of a transistor with the SSG 410) or an deselect voltage (for example, 0 V) to the corresponding SSG 410 through one or more SSG lines 415.

As shown in FIG. 4, the NAND memory strings 408 can be organized into a plurality of blocks 404. Each of the plurality of blocks 404 may have a common source line 414 (e.g., coupled to the ground). In some implementations, each block 404 is a basic data unit for an erase operation, i.e., all memory cells 406 on the same block 404 are erased at the same time. To erase memory cells 406 in a selected block 404, the source line 414 coupled to the selected block 404 as well as unselected blocks 404 in a same plane as the selected block 404 may be biased with an erase voltage (Vers) (such as a high positive voltage of 20 V or more). It should be understood that in some examples, an erase operation may be performed at a level of a half of a block, a quarter of a block, or any suitable number of blocks or any suitable fraction of a block. Memory cells 406 of adjacent NAND memory strings 408 may be coupled through word lines 418. The word line 418 selects which row of memory cells 406 receive read and programming operations. In some implementations, memory cells 406 coupled to a same word line 418 are referred to as a page 420. The page 420 is a basic data unit for a programming or read operation. The size of one page 420 in bits may related to the number of NAND memory strings 408 coupled by the word line 418 in one block 404. Each word line 418 may include a plurality of control gates (gate electrodes) at each memory cell 406 on a respective page 420 and a gate line coupling the control gates.

Figure 5:
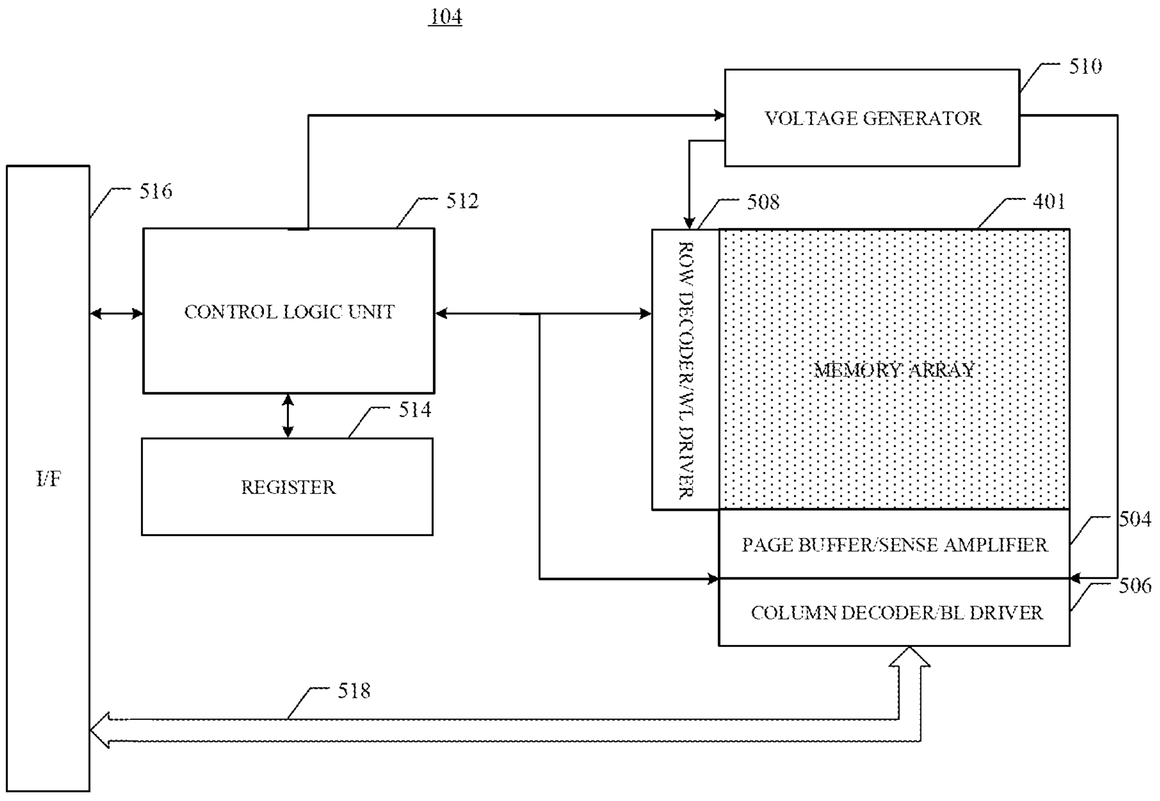
FIG. 5 is a schematic diagram of a memory including a memory array and a peripheral circuit.

Referring back to FIG. 4, the peripheral circuit 402 may be coupled to the memory array 401 through the bit lines 416, the word lines 418, the source lines 414, the SSG lines 415, and the DSG lines 413. The peripheral circuit 402 may include any suitable analog, digital, and mixed-signal circuit for facilitating the operations of the memory array 401 by applying voltage signals and/or current signals to each target memory cell 406 and sensing voltage signals and/or current signals from each target memory cell 406, through the bit lines 416, the word lines 418, the source lines 414, the SSG lines 415, and the DSG lines 413. The peripheral circuit 402 may include various types of peripheral circuits formed using metal-oxide-semiconductor (MOS) technologies. For example, FIG. 5 shows some peripheral circuits. The peripheral circuits 402 include a page buffer/sense amplifier 504, a column decoder/bit line driver 506, a row decoder/word line driver 508, a voltage generator 510, a control logic unit 512, a register 514, an interface 516, and a data bus 518. It should be understood that in some examples, additional peripheral circuits not shown in FIG. 5 may be included as well.

In some implementations, the page buffer/sense amplifier 504 may be configured to read data from the memory array 401 and program (write) data to the memory array 401 according to a control signal from the control logic unit 512. In one example, the page buffer/sense amplifier 504 may store one page of programming data (write data) to be programmed into one page 420 of the memory array 401. In another example, the page buffer/sense amplifier 504 may perform a programming verification operation to ensure that data has been properly programmed into memory cells 406 coupled to a selected word line 418. In still another example, the page buffer/sense amplifier 504 may also sense a low power signal that is from the bit line 416 and represents a data bit stored in a memory cell 406, and amplify a small voltage swing to a recognizable logic level in a read operation. The column decoder/bit line driver 506 may be configured to be controlled by the control logic unit 512 and select one or more NAND memory strings 408 by applying a bit line voltage generated by the voltage generator 510.

The row decoder/word line driver 508 may be configured to be controlled by the control logic unit 512 and select/deselect a block 404 of the memory array 401 and select/deselect a word line 418 of the block 404. The row decoder/word line driver 508 may be further configured to drive a word line 418 using a word line voltage generated from the voltage generator 510. In some implementations, the row decoder/word line driver 508 may also select/deselect and drive the SSG line 415 and the DSG line 413. In some implementations, the row decoder/word line driver 508 is configured to perform an erase operation on memory cells 406 coupled to select word line(s) 418. The voltage generator 510 may be configured to be controlled by the control logic unit 512 and generate a word line voltage (e.g., a read voltage, a programming voltage, a pass voltage, a local voltage, a verify voltage, or the like), a bit line voltage, and a source line voltage to be supplied to the memory array 401.

The control logic unit 512 may be coupled to each peripheral circuit described above and configured to control the operations of each peripheral circuit. The register 514 may be coupled to the control logic unit 512 and include a status register, a command register, and an address register for storing status information, a command operation code (OP code), and a command address for controlling the operations of each peripheral circuit. The interface 516 may be coupled to the control logic unit 512 and act as a control buffer to buffer a control command received from a host (not shown) and relay the control command to the control logic unit 512 and buffer status information received from the control logic unit 512 and relay the status information to the host. The interface 516 may also be coupled to the column decoder/bit line driver 506 via the data bus 518 and act as a data I/O interface and a data buffer to buffer data and relay the data to the memory array 401 or relay or buffer data from the memory array 401. That is, the interface 516 here is an interface coupled to the back end interface of the foregoing memory controller. That is, the interface 516 may also be an interface for the memory to communicate with the memory controller.

The introduction to the memory array in FIG. 4 is based on an example of an actual physical structure of a memory. In other words, the memory array in FIG. 4 is a location of actually stored data. Therefore, an address storing data here is a physical address, which may also be referred to as an actual address of the memory array. In an actual application, for the electronic device shown in FIG. 1, a user may assign a logical address (LA) by using an operating system (OS) included in the host 108. Data is written into a respective physical address of the memory array or data is read from a respective physical address of the memory array by using a conversion algorithm between a logical address and a physical address of a flash translation layer (FTL) in the memory system 102.

In a process of actual application, the memory array of the memory system included in the electronic device 100 includes a fixed number of blocks. Generally, before a memory device (for example, the foregoing SSD or UFS) is delivered from the factory, a manufacturer divides a memory array included in the memory device according to uses. In some implementations, the memory array in the memory device is divided into a user data pool and a system pool. The user data pool further includes a memory area and over provisioning (OP). The memory area is an area for storing user data in the memory array. Capacity of the area is also referred to as user capacity. A user may write data into the area or may read data from the area. That is, the user may access the area. The OP may be an area that is reserved by the manufacturer before the memory device leaves the factory and for which no use is planned. This area may not be accessed by a user, and its capacity is not shown by the OS of the host, and it is completely provided for use by the memory controller of the SSD.

Here, the system pool may refer to an area planned to store management data in the memory device. The management data may include, but not limited to, a logical address to physical address (L2P) mapping table required for an FTL algorithm, a cache data backup of the memory controller, and the like.

In some implementations, the user data pool, the system pool, and the over provisioning have the following relationship: when the actual capacity of the memory device is fixed, if the capacity allocated to the system pool is higher, the capacity allocated to the user data pool is lower. In this case, if it is ensured that the user capacity remains unchanged, the over provisioning is smaller. In contrast, when the actual capacity of the memory device is fixed, if the capacity allocated to the system pool is lower, the capacity allocated to the user data pool is higher. In this case, if it is ensured that the user capacity remains unchanged, the over provisioning is larger. In a process of actual application, a memory device with larger over provisioning can improve the performance and can usually improve the durability of the memory device, thereby increasing the service life of the memory device. Based on the foregoing relationship, when the actual capacity of the memory device is fixed, if the user capacity is guaranteed, the capacity allocated to the system pool may be appropriately reduced, in order to improve the performance and durability of the memory device.

Figure 6:
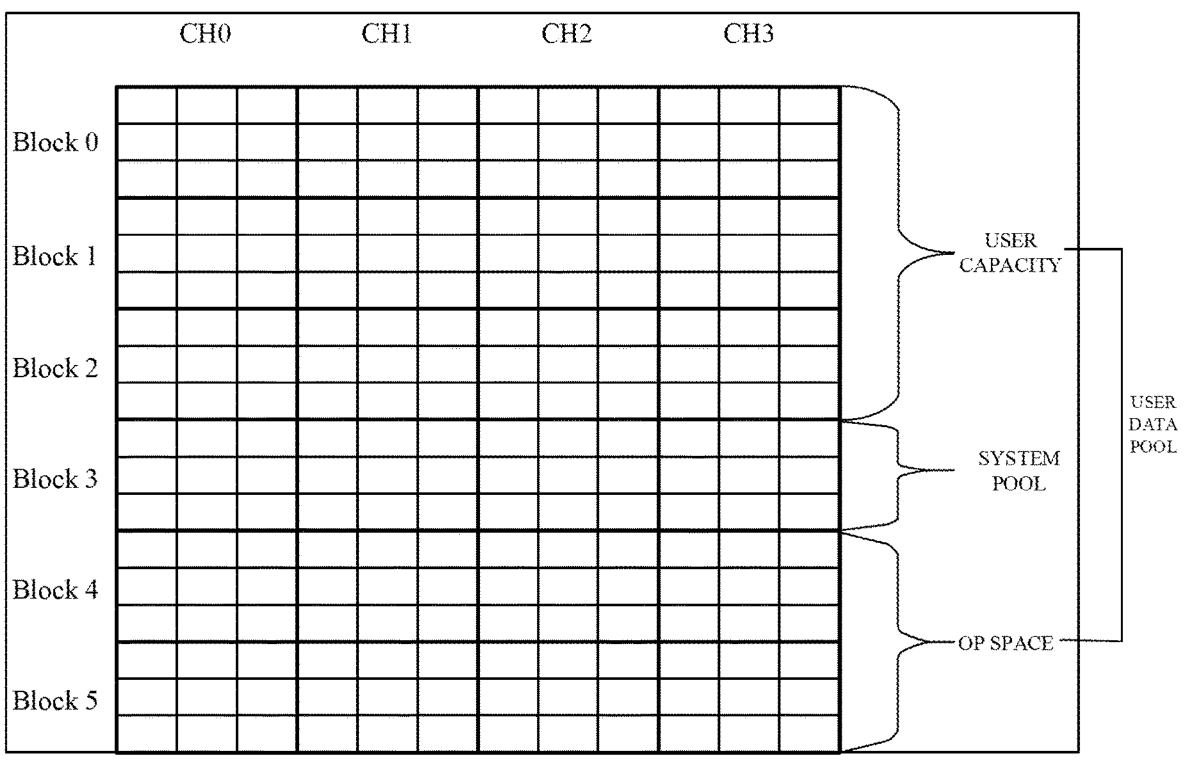
FIG. 6 is a schematic diagram of a virtual mini SSD provided by the present application.

For example, a virtual mini SSD is shown in FIG. 6. As shown in FIG. 6, it is assumed that one SSD includes four channels (CH0 to CH3), which are connected to four dies (the die on each channel may be operated in parallel). It is assumed that each die has six flash blocks (Block0 to Block5). The SSD includes a total of 24 flash blocks. Each flash block has nine small boxes. The size of each small box is the same as that of a logical page. In this scenario, one planning approach may be as follows: In the foregoing 24 flash blocks, it is assumed that the size of 12 flash blocks (for example, Block0 to Block2) is SSD capacity (or user capacity), with which the flash blocks may be accessed by a user. Four other flash blocks (Block3) are allocated to the system pool. In this case, the over provisioning (OP) includes eight flash blocks (Block4 to Block5). If the user capacity remains unchanged and is still 12 flash blocks and if eight flash blocks are allocated to the system pool, in this case, there are only four remaining flash blocks for the over provisioning (OP).

Based on the foregoing memory device and electronic device, before some operations are performed, some volatile data in the memory controller included in the memory system needs to be backed up. For example, redundancy check data in the memory controller needs to be backed up when switching to a stop start unit (SSU) mode or an auto-standby mode or a write booster (WB) mode. For another example, redundancy check data in the memory controller needs to be backed up during an operation of reconstructing a backup area.

during the use, a relatively large number of backup areas used for backing up the redundancy check data in the memory controller are allocated in the memory array in the memory. The backup areas belong to the system pool, and therefore, when a large number of blocks are allocated to the system pool, under the premise of guaranteeing the user capacity, the OP includes a relatively small number of blocks. That is, the OP is reduced, which affects the service life and programming performance of the memory device. Researches have shown that a larger number of backup areas are kept for the following reasons. On the one hand, the memory controller includes two types of redundancy check data, where one type of redundancy check data is generated from a write command sent by a host coupled with the memory controller (the memory device or the memory system), and the other type of redundancy check data is generated from garbage collection (GC). For ease of subsequent description, the redundancy check data generated from the write command sent by the host coupled with the memory controller may also be referred to as L2 redundancy check data or L2 Parity, and a write operation that the memory controller causes the memory to perform in response to a write command is simply referred to as L2 Write. The redundancy check data generated from garbage collection (GC) is referred to as GC Parity. and a write operation that the memory controller causes the memory to perform in response to a write command in a GC process is simply referred to as GC Write. At present, for different types of redundancy check data, there are different backup areas and backup modes. On the other hand, when a new backup area to be used is created, the phenomenon of a cross memory block (Cross VB) occurs. For the Cross VB, during backup of L2 Parity, if data amount to be written of the L2 Parity is greater than remaining capacity of a backup area in use, a part of such L2 Parity to be written is written into a backup area that has been used, and another part is written into a new backup area. In this case, the same batch of L2 Parity is written into different backup areas. This case is referred to as Cross VB. In this case, at least one used backup area that is required is kept. Furthermore, an erase operation for a backup area that has been used is performed only when a backup area to be used is created next time. In this case, even if L2 Parity in a backup area that has been used has all been updated to a new backup area or already becomes invalid (becomes useless) the backup area that has been used is still kept, when a backup operation has not been performed for a long time and a new backup area has not been created for a long time. As a result, the service life cycle of the backup area for L2 Parity in the system pool is long, thereby resulting in reduced OP, which affects the performance and durability of the memory device.

Figure 7:
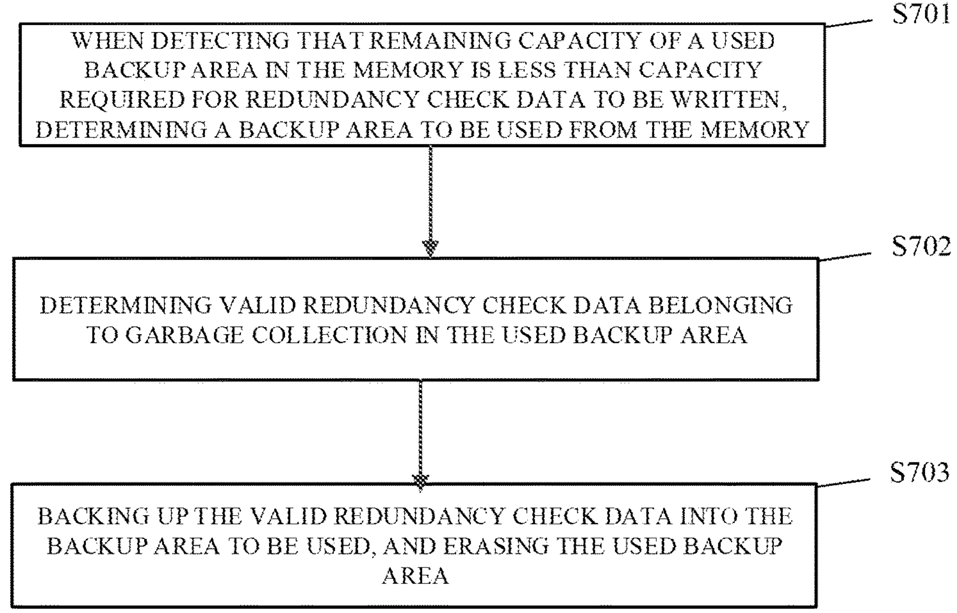
FIG. 7 is a schematic flowchart of an operating method for a memory controller provided by an implementation of the present application.

To resolve the foregoing technical problems, referring to FIG. 7, implementations of the present application provide an operating method for a memory controller. It is to be noted that the memory controller is coupled with one or more memories. Specifically, the operating method may include the following steps:

S701: upon detecting that remaining capacity of a used backup area in the memory is less than capacity required for redundancy check data to be written, determining a backup area to be used from the memory;

S702: determining valid redundancy check data belonging to garbage collection in the used backup area; and S703: backing up the valid redundancy check data into the backup area to be used, and erasing the used backup area.

Figure 8:
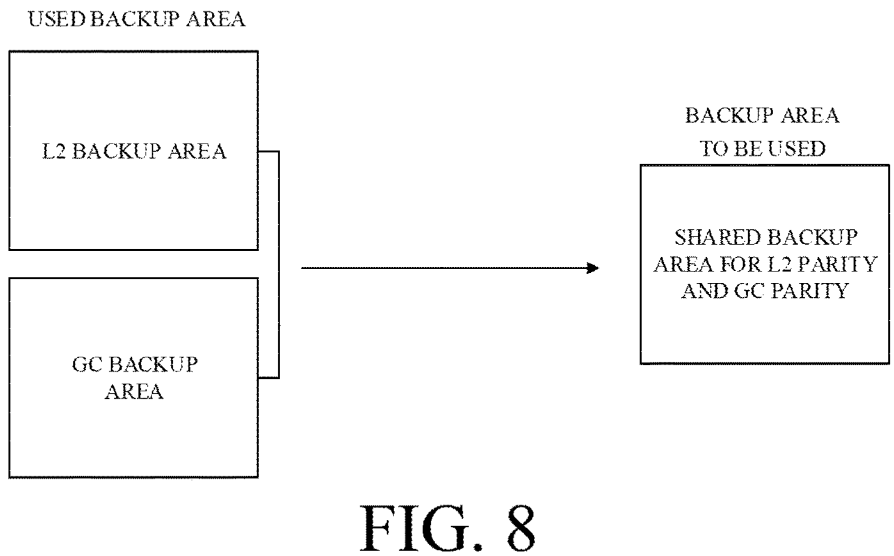
FIG. 8 is a schematic diagram of a concept of the operating method shown in FIG. 7 provided by an implementation of the present application.

It is to be noted that the operating method provided in the implementations of the present application may be performed on a memory controller side. The foregoing operating method is an management operation on a backup area for backing up redundancy check data in a system pool. The management concept of the backup area for backing up the redundancy check data in the system pool in the present application is shown in FIG. 8. The management concept shown in FIG. 8 is that, when backup is required, L2 Parity and GC Parity are backed up together to a same backup area (Swap VB), and one backup management table (Swap VB list) is jointly maintained for the management of the backup area, thereby reducing the backup area, allocated to the system pool, for backing up the redundancy check data, and reducing a memory area for storing the backup management table.

The process of the foregoing operation may be specifically include that: when detecting that remaining capacity of a used backup area in the memory is less than capacity required for redundancy check data to be written, the memory controller determines a backup area to be used from the memory. That is, the memory controller searches a memory array included in the memory for some blocks in an idle state for use as the backup area to be used. Subsequently, the memory controller determines valid redundancy check data (that is, valid GC Parity) belonging to garbage collection in the used backup area, backs up the valid redundancy check data into the backup area to be used, and erases the used backup area, so as to manage the backup areas for backing up redundancy check data.

The used backup area includes a backup area that has been used for backing up the L2 Parity (referred to as an L2 backup area hereinafter) and/or a backup area that has been used for backing up the GC Parity (referred to as a GC backup area hereinafter). That is, when detecting that remaining capacity of at least one of the used L2 backup area and the used GC backup area is less than the capacity required for the redundancy check data to be written, the memory controller of the present application determines a new backup area to be used from the memory array included in the memory. The redundancy check data to be written may include L2 Parity and/or GC Parity. Specifically, timing for creating the new backup area to be used in the operating method provided in the implementations of the present application may include, but not limited to that: the memory controller detects that the remaining capacity of the used L2 backup area is less than L2 Parity to be written; or, the memory controller detects that the remaining capacity of the used GC backup area is less than GC Parity to be written; or, the memory controller detects that the remaining capacity of the used L2 backup area is less than the L2 Parity to be written and detects that the remaining capacity of the used GC backup area is less than the GC Parity to be written. Then, the new backup area to be used is determined. The backup area to be used here is neither used for backing up the L2 Parity only nor backing up the GC Parity only, but is instead a shared backup area for redundancy check data (L2 Parity & GC Parity) when the backup process is started and the L2 Parity & GC Parity needs to be backed up.

In some implementations, the memory controller searching the memory array for some blocks in the idle state may be implemented according to a management program for the memory array, which is stored in the memory controller. For example, the blocks in the idle state are determined by using valid data amount of each memory block maintained by firmware of the memory controller. When determining the blocks in the idle state based on the maintained valid data amount of each memory block as described above, the blocks in the idle state may refer to blocks with the valid data amount being 0. In fact, for the block in the idle state, a threshold voltage distribution of a memory cell included therein is within a voltage range of an erased state corresponding to a type of the memory cell (SLC or MLC or TLC or QLC).

In some implementations, the operating method further includes: maintaining a backup management table, the backup management table being used for recording backup areas, that include the backup area to be used, in use for storing redundancy check data; where the redundancy check data includes redundancy check data belonging to garbage collection and/or redundancy check data generated from a write command of a host coupled with the memory controller.

It is to be noted that the backup management table here may be used for recording backup areas, that include the backup area to be used, in use for storing redundancy check data when it is considered to back up both L2 Parity and GC Parity into the same backup area. In a process of actual application, when backup is required, one of the L2 Parity and the GC Parity may not exist (in other words, there may be no valid data). For example, when L2 Write has not occurred for a long time, the memory controller does not generate the L2 Parity. In this case, when backup occurs, there is no need to back up the L2 Parity in the memory controller. Therefore, the foregoing redundancy check data includes redundancy check data belonging to garbage collection and/or redundancy check data generated from a write command of the host coupled with the memory controller.

In some implementations, the maintaining the backup management table includes updating first management information corresponding to the backup area to be used to the backup management table, and deleting second management information corresponding to the used backup area from the backup management table, where the first management information includes at least first address information of the backup area to be used in the memory, and the second management information includes at least second address information of the used backup area in the memory.

It is to be noted that the backup management table may be a linked list. The linked list may be a linear storage structure discontinuous in physical storage, in which a logical order of data elements is indicated by a connecting order of pointers in the linked list. In the implementations of the present application, the backup management table maintained by the memory controller may be formed by a series of nodes. Each node includes two portions: the first portion is a data domain for storing second management information; and the second portion is a pointer domain for storing a base address of a next node. When the memory controller determines a new backup area to be used, the memory controller inserts first management information corresponding to the backup area to be used in the backup management table. The first management information may include first address information corresponding to the backup area to be used. When the memory controller erases a used backup area, the memory controller deletes second management information corresponding to the used backup area from the backup management table. The second management information may include second address information corresponding to the used backup area. It should be understood that the first address information and the second address information mentioned here are a physical address or a logical address of a backup area in the memory array.

In some implementations, the backup management table is stored in the memory controller and/or the memory.

It is to be noted that in a process of actual application, the backup management table may be stored in a cache of the memory controller and/or the memory array included in the memory. It should be understood that if the backup management table is stored in the memory array, blocks occupied by the backup management table belong to the system pool. Therefore, in the present application, the L2 Parity and the GC Parity are backed up together to the same backup area, and one backup management table is maintained, so that actually the number of blocks allocated to the system pool is appropriately reduced, so as to increase the number of blocks allocated to the user data pool, thereby guaranteeing larger OP, and improving the performance and service life of the memory device.

In some implementations, the operating method further includes: setting a set backup flag bit to a first flag, where the backup flag bit is used for indicating a backup mode for redundancy check data in a check cache of the memory controller; and when the backup flag bit is set to the first flag, the backup mode includes backing up all redundancy check data in the check cache to the backup area to be used.

It is to be noted that firmware included in the memory controller may keep one backup flag bit. The backup flag bit is used for indicating a backup mode for redundancy check data in a check cache of the memory controller. Specifically, when the backup flag bit is set to the first flag, the backup mode includes backing up all redundancy check data in the check cache to the backup area to be used.

In a process of actual use, timing for setting the backup flag bit to the first flag includes, but not limited to: setting the backup flag bit to the first flag when the erasure of all used backup areas is completed; or setting the backup flag bit to the first flag every time a new backup area to be used is determined. The first flag is 1 or 0, and a corresponding second flag described below may be 0 or 1, as long as the first flag and the second flag are different flags.

The check cache is an area for temporarily storing redundancy check data. In a process of actual application, the check cache in the memory controller includes a L2 check cache for caching the L2 Parity and a GC check cache for caching the GC Parity. The backup flag bit is set to the first flag at both timing for setting the backup flag bit to the first flag as described above, so that during the backup of redundancy check data, the backup mode of backing up all redundancy check data in the check cache to the backup area to be used is employed. That is, the L2 Parity and the GC Parity that respectively correspond to the L2 check cache and the GC check cache are backed up to the backup area to be used. Specifically, the reason of using the mode of backing up all redundancy check data in the check cache may be that: latest valid redundancy check data (L2 Parity and/or GC Parity) is cached in the L2 check cache and the GC check cache.

It is to be noted that during actual planning, the backup areas may have the same capacity. For example, the capacity of each backup area may be 100 MB, or the like. Specifically, the capacity of a backup area may be determined according to the capacity and use of the memory device. In some implementations, the capacity of the backup area to be used is greater than the capacity of the check cache (the L2 check cache and the GC check cache). Specifically, the capacity of the backup area to be used includes, but not limited to, being several times, tens of times, hundreds of times, or the like of the capacity of the check cache. Specifically, a capacity relationship between the two needs to be determined according to an actual case.

In some implementations, the backing up all redundancy check data in the check cache to the backup area to be used includes: gradually traversing the redundancy check data in the check cache, and sequentially backing up the redundancy check data in the check cache to the backup area to be used; where the redundancy check data includes redundancy check data belonging to garbage collection and/or redundancy check data generated from a write command of a host coupled with the memory controller.

It is to be noted that the gradually traversing the redundancy check data in the check cache here may include respectively traversing the L2 Parity in the L2 check cache and traversing the GC Parity in the GC check cache.

In a process of actual use, the memory controller maintains one redundancy check data storage table respectively for the L2 Parity and the GC Parity, for example, an L2 storage table and a GC storage table. A similar traversal mode is used for each storage table. The L2 storage table is only used as an example for description here. The L2 storage table may be a linked list. Based on this, each node in the L2 storage table stores storage address information corresponding to the L2 Parity in the L2 check cache and a pointer pointing to a next node. In this case, traversing the L2 Parity in the L2 check cache may include: starting from a root node of the L2 storage table, gradually searching for address information stored on nodes in the L2 memory table based on a pointer stored on each node; obtaining L2 Parity corresponding to the address information; and backing up the obtained L2 Parity to the backup area to be used. In this way, all the L2 Parity in the L2 check cache is traversed and obtained, to back up all the L2 Parity in the L2 check cache to the backup area to be used. For the traversal of the GC Parity in the GC check cache, reference may be made to the backup of all L2 Parity in the L2 check cache as described above.

In some implementations, the operating method further includes, after the backup of all the redundancy check data in the check cache has been completed, setting the backup flag bit to a second flag, where when the backup flag bit is set to the second flag, the backup mode includes backing up redundancy check data in an updated state in the check cache to the backup area to be used.

It is to be noted that, the backup of all the redundancy check data in the check cache has been completed here, which means that the backup of all the L2 Parity in the L2 check cache and all the GC Parity in the GC check cache has been completed. The backing up redundancy check data in the updated state in the check cache to the backup area to be used may include: backing up L2 Parity in an updated state in the L2 check cache and/or GC Parity in an updated state in the GC check cache.

In a process of actual application, a user may write data into the memory device multiple times. However, remaining capacity of a backup area in use is not insufficient each time redundancy check data generated from each write needs to be backed up. In this case, after all redundancy check data has been backed up to the backup area to be used currently, the backup flag bit needs to be set to the second flag to restore to the original backup mode for subsequent use. When the backup flag bit is set to the second flag, the backup mode may include: backing up redundancy check data in an updated state and generated from a write command of a host coupled with the memory controller and redundancy check data in an updated state and belonging to garbage collection in the memory controller to the backup area to be used. That is, only redundancy check data in an updated state is backed up, and the rest is not backed up.

In some implementations, the determining valid redundancy check data belonging to garbage collection in the used backup area includes determining a valid data recording table of the used backup area, and determining the valid redundancy check data based on the valid data recording table.

It is to be noted that FW of the memory controller may further maintain one valid data recording table (Bitmap) for each memory block. The bitmap is used for identifying whether a physical page in the memory block is valid. Therefore, in the present application, the valid redundancy check data belonging to garbage collection in the backup area may be determined based on the bitmap.

In a process of actual application, an implementation of backing up the valid redundancy check data into the backup area to be used may include, but not limited to: directly implementing data transmission in the memory, for example, data transmission between planes of the memory array; or first reading the valid redundancy check data by using the memory controller, and controlling and writing, by the memory controller, the valid redundancy check data into the backup area to be used.

In a process of actual application, the erasing the used backup area may include: controlling, by the memory controller, a peripheral circuit of the memory to select blocks included in the used backup area for simultaneous erasure, sequential erasure, or the like. An erasure process is not the focus of the present application, and any approach that can erase the used backup area can be used. A specific erasure process is not further described in detail herein.

Figure 9:
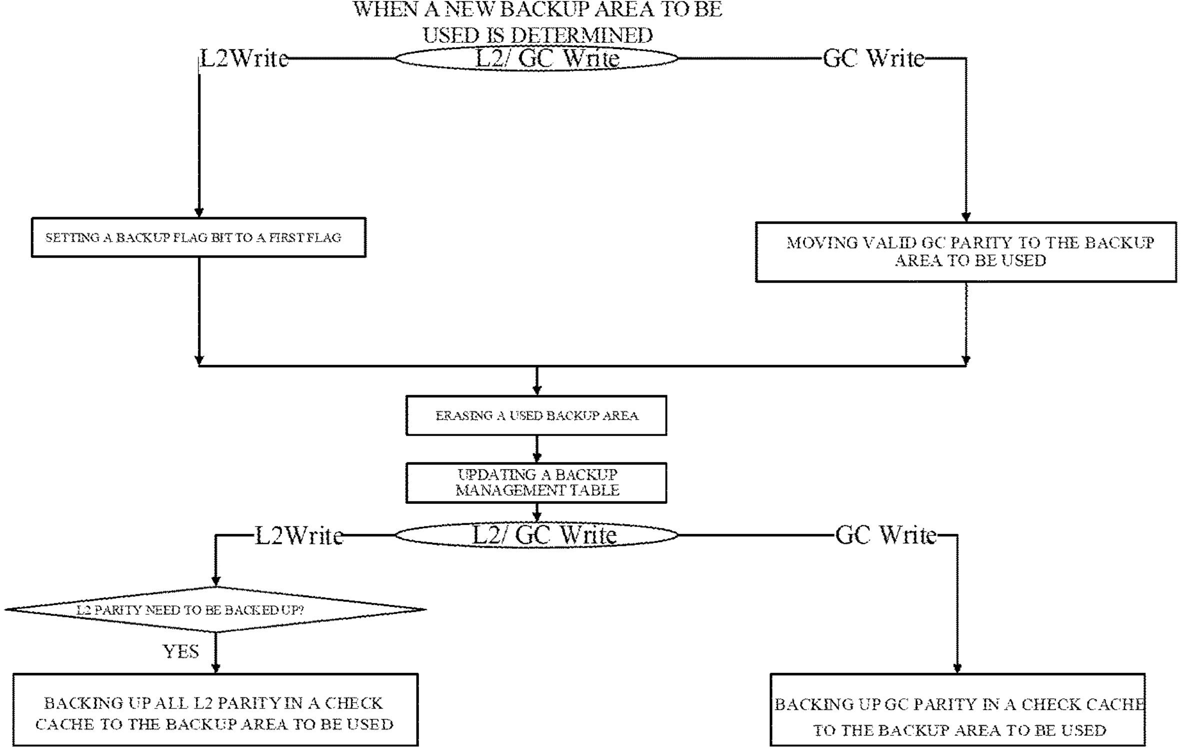
FIG. 9 is a schematic flowchart of an implementation of the operating method shown in FIG. 7 provided by an implementation of the present application.

In order to understand the present application, FIG. 9 is a schematic flowchart of an implementation of the operating method provided by implementations of the present disclosure.

Based on the procedure shown in FIG. 9, an implementation procedure of the operating method provided by the implementations of the present disclosure may be as follows: when determining a new backup area to be used, it is considered to simultaneously back up L2 Parity generated from L2 Write and GC Parity generated from GC Write to the backup area to be used. Specifically, valid GC Parity in a backup area that has been used is moved to the new backup area to be used. A set backup flag bit is set to a first flag, to back up L2 Parity and/or GC Parity in the check cache of the memory controller to the backup area to be used. L2 Parity and/or GC Parity in the memory controller are backed up to the backup area to be used in a traversal mode.

It is to be noted that, FIG. 9 also shows that it is necessary to determine whether L2 Parity needs to be backed up. As discussed above, when L2 Write has not occurred for a long time, the memory controller does not generate L2 Parity. In this case, when backup occurs, there is no need to back up L2 Parity in the memory controller. Therefore, during backup, it is necessary to determine whether L2 Parity needs to be backed up.

In the operating method for the memory controller provided in the implementations of the present application, when a new backup area to be used is created, valid redundancy check data belonging to garbage collection in a used backup area is backed up to the backup area to be used, and the used backup area is erased: and all redundancy check data in a check cache is backed up to the backup area to be used. In such a backup area management mode and check data backup mode, data security is ensured, the number of blocks allocated to a system pool in a memory can be appropriately reduced, and the number of blocks allocated to a user data pool is increased, so that the OP of the memory is increased, thereby improving the performance and service life of a memory system.

Based on the same inventive concept, the implementations of the present application further provide a memory controller. The memory controller is coupled with one or more memories. The memory controller includes a processor, where:

the processor is configured to: when detecting remaining capacity of a used backup area in the memory is less than capacity required for redundancy check data to be written, determine a backup area to be used from the memory; determine valid redundancy check data belonging to garbage collection in the used backup area; and back up the valid redundancy check data into the backup area to be used, and erase the used backup area.

In some implementations, the processor is further configured to: maintain a backup management table, the backup management table being used for recording backup areas in use for storing redundancy check data that include the backup area to be used, where the redundancy check data includes redundancy check data belonging to garbage collection and/or redundancy check data generated from a write command of a host coupled with the memory controller.

In some implementations, the processor is further configured to: update first management information corresponding to the backup area to be used to the backup management table; and delete second management information corresponding to the used backup area from the backup management table, where the first management information includes at least first address information of the backup area to be used in the memory, and the second management information includes at least second address information of the used backup area in the memory.

In some implementations, the memory controller further includes a check cache, the processor is further configured to: set a set backup flag bit to a first flag, where the backup flag bit is used for indicating a backup mode for redundancy check data in the check cache; and when the backup flag bit is set to the first flag, the backup mode includes backing up all redundancy check data in the check cache to the backup area to be used.

In some implementations, the memory controller further includes a back end interface coupled with the memory, the processor is further configured to: gradually traverse the redundancy check data in the check cache, and sequentially generate a set of write commands; and send the set of write commands to the memory through the back end interface, and he memory is configured to: back up the redundancy check data in the check cache to the backup area to be used in response to the set of write commands;

where the redundancy check data includes redundancy check data belonging to garbage collection and/or redundancy check data generated from a write command of a host coupled with the memory controller.

In some implementations, the processor is further configured to: determine a valid data recording table of the used backup area; and determine the valid redundancy check data based on the valid data recording table.

In some implementations, the processor is further configured to: after the backup of all the redundancy check data in the check cache has been completed, set the backup flag bit to a second flag, where when the backup flag bit is set to the second flag, the backup mode includes backing up redundancy check data in an updated state in the check cache to the backup area to be used.

It is to be noted that the memory controller and the foregoing operating method for the memory controller belong to the same inventive concept. The terms appearing for the memory controller have all been explained in detail for the operating method and the memory controller described previously, and are also applicable here, and thus are not further described any more here. It should be understood that only the structure of the memory controller most related to the technical solutions of the present application is described here. For the structure and description of the memory controller shown in FIG. 1 to FIG. 3, they are also included and are applicable for the memory controller provided in the present application. The memory controller also includes structures not shown but required for the normal operation of the memory system, which, given the length of the application documents, are not further described in the present application.

Figure 10:
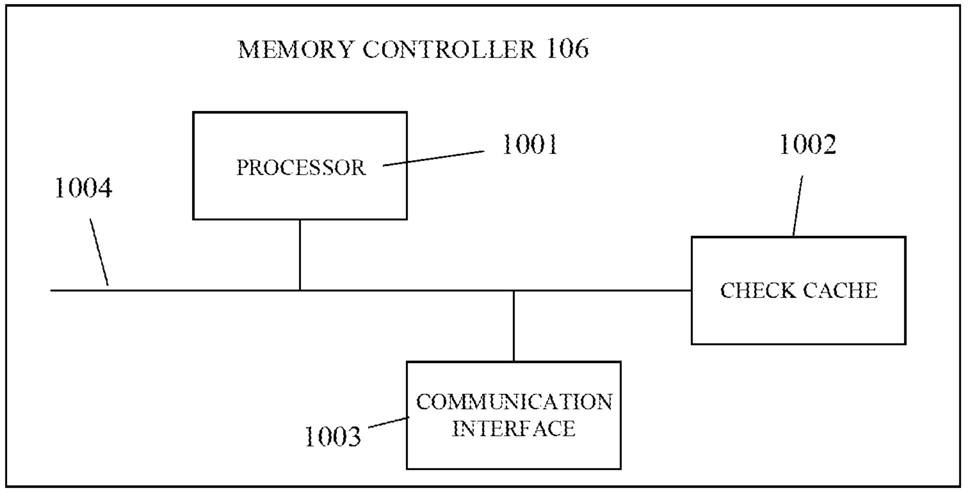
FIG. 10 is a schematic diagram of a hardware structure of a memory controller provided by an implementation of the present application.

For example, FIG. 10 is a schematic diagram of a hardware structure of a memory controller provided in the present application. The memory controller 106 includes at least one processor 1001, a check cache 1002, and at least one communication interface 1003 (for example, the foregoing front end interface and back end interface). The components in the memory controller 106 are coupled together by a bus system 1004. It may be understood that the bus system 1004 is configured to implement connection and communication among these components. The bus system 1004 further includes a power bus, a control bus, and a status signal bus in addition to a data bus. However, for clarity of description, various buses in FIG. 10 are shown as the bus system 1004.

It may be understood that the check cache 1002 may be any one of a level 1 cache (L1 Cache), a level 2 cache (L2 Cache), a level 3 cache (L3 Cache) or any combination of the three. According to the use function, the check cache 1002 includes at least an L2 check cache and a GC check cache.

The memory controller 106 may also contain other storage structures. These storage structures are collectively referred to as internal storage. The internal storage may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disc, or a compact disc read-only memory (CD-ROM). The magnetic surface memory may be a disk memory or a magnetic tape memory. The volatile memory may be a random access memory (RAM), which is used as an external cache. By way of illustration, but not limitation, many forms of RAM are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct Rambus random access memory (DRRAM). The check cache 1002 described in the implementations of the present disclosure is intended to include, but is not limited to, these and any other suitable types of memories.

The check cache 1002 in the implementations of the present disclosure is configured to store various types of data to support the operations of the memory controller 106. Examples of such data include any computer program operated on the memory controller 106. For example, redundancy check data may be included in the check cache 1002.

The methods disclosed in the implementations of the present disclosure may be applied to the processor 1001 or implemented by the processor 1001. The processor may be an integrated circuit chip having a signal processing capability. During implementation, the steps in the foregoing methods may be accomplished by integrated logic circuits of hardware or instructions in a software form in the processor. The processor may be a general-purpose processor, a digital signal processor (DSP), or another programmable logic device, discrete gate or transistor logic device, a discrete hardware component, or the like. The methods, steps, and logic block diagrams disclosed in the implementations of the present disclosure can be implemented or executed by the processor. The general-purpose processor may be a microprocessor or any conventional processor or the like. The steps in the methods disclosed in combination with the implementations of the present disclosure may be directly performed and accomplished by a hardware decoding processor or performed and accomplished by a combination of hardware in a decoding processor and software modules. The software modules may reside in a storage medium. The storage medium is located in the memory. The processor reads information in the memory and accomplishes the steps in the foregoing methods in combination with hardware of the processor.

In implementations, the memory controller 106 may be implemented by one or more application-specific integrated circuits (ASICs), DSPs, programmable logic devices (PLDs), complex programmable logic devices (CPLDs), field-programmable gate arrays (FPGAs), general-purpose processors, controllers, micro controller units (MCUs), microprocessors, or other electronic elements for performing the above methods.

In several implementations provided in the present application, it should be understood that the disclosed devices and methods may be implemented in other forms. The device implementations described above is merely exemplary. For example, the division of the units is merely logical function division and there may be other division in actual implementation. For example, a plurality of units or components may be combined or may be integrated into another system, or some features may be ignored or not performed. In addition, the mutual coupling or direct coupling or communication connections between the components, as shown or discussed, may be implemented through some interfaces, indirect coupling or communication connections between the devices or units, or may be electrical, mechanical, or in other forms.

The units described above as separate parts may or may not be physically separate, and parts shown as units may or may not be physical units, that is, may be located in one position, or may be distributed on a plurality of network units. Some or all of the units may be selected according to actual needs to achieve the objects of the solutions in the implementations.

In addition, functional units in the implementations of the present disclosure may all be integrated into one processing unit, or each of the units may exist alone, or two or more units may be integrated into one unit. The integrated unit may be implemented in the form of hardware or may be implemented in hardware plus a software functional unit.

A person of ordinary skill in the art may understand that all or part of the steps implementing the foregoing method implementations may be accomplished by program instructions related hardware. The foregoing program may be stored in a computer-readable storage medium. The problem, when executed, performs the steps in the foregoing method implementations. The foregoing storage medium includes various media that can store program code such as a removable storage device, a read-only memory (ROM), a random access memory (RAM), a magnetic disk, an optical disc, or the like.

Alternatively, when the foregoing integrated units of the present disclosure are implemented in the form of a software functional modules and sold or used as an independent product, the integrated units may be stored in a non-transitory computer-readable storage medium. Based on such an understanding, the technical solutions in the implementations of the present disclosure essentially, or the part contributing to the prior art, may be implemented in the form of a software product. The software product is stored in a storage medium and includes several instructions for causing a computer device (which may be a personal computer, a server, a network device, or the like) to perform all or some of the steps of the methods described in various implementations of the present disclosure. The foregoing storage medium includes various media that can store program code, such as a removable memory device, a ROM, a RAM, a magnetic disk, an optical disc, or the like.

Based on the foregoing solution, the present application further provides a memory system, including: one or more memories, the one or more memories including a memory array, and a memory controller coupled with the one or more memories and configured to control the one or more memories. The memory controller includes a processor, where the processor is configured to: when detecting that remaining capacity of a used backup area in the memory array is less than capacity required for redundancy check data to be written, determine a backup area to be used from the memory array; determine valid redundancy check data belonging to garbage collection in the used backup area; and back up the valid redundancy check data into the backup area to be used, and erase the used backup area.

In some implementations, the memory controller further includes a check cache, the processor is further configured to: set a set backup flag bit to a first flag, where the backup flag bit is used for indicating a backup mode for redundancy check data in the check cache, and when the backup flag bit is set to the first flag, the backup mode includes backing up all redundancy check data in the check cache to the backup area to be used.

In some implementations, the memory controller further includes a back end interface coupled with the memory, the processor is further configured to: gradually traverse the redundancy check data in the check cache, and sequentially generate a set of write commands; and send the set of write commands to the memory through the back end interface, and the memory is further configured to: back up the redundancy check data in the check cache to the backup area to be used in response to the set of write commands, where the redundancy check data includes redundancy check data belonging to garbage collection and/or redundancy check data generated from a write command of a host coupled with the memory controller.

In some implementations, the memory system is contained in one of: a solid state drive (SSD), and a memory card.

It is to be noted that the memory system and the foregoing operating method for the memory controller belong to the same inventive concept. The memory system includes the foregoing memory controller. Therefore, the terms appearing here have all been explained in detail for the operating method and the memory controller described previously, and are also applicable here, and thus are not further described any more here. It should be understood that only the structure of the memory controller most related to the technical solutions of the present application is described here. For the structure and description of the memory system shown in FIG. 1 to FIG. 6, they are also included and applicable for the memory system provided in the present application. The memory system also includes structures not shown but required for the normal operation of the memory system, which, given the length of the application documents, are not further described in the present application.

The present application further provides an electronic device, including a memory system, the memory system including one or more memories, the one or more memories including a memory array, a memory controller coupled with the memory and configured to control the memory, and a host coupled with the memory system, where the memory controller includes: a front end interface coupled with the host, a processor, a check cache, and a back end interface coupled with the memory, where the processor is configured to: when detecting that remaining capacity of a used backup area in the memory array is less than capacity required for redundancy check data to be written, determine a backup area to be used from the memory array; determine valid redundancy check data belonging to garbage collection in the used backup area; back up the valid redundancy check data into the backup area to be used, and erase the used backup area; and set a set backup flag bit to a first flag, the host is configured to: send a backup command to the memory controller, the processor is further configured to: receive the backup command through the front end interface; check the backup flag bit in response to the backup command; perform a backup operation on redundancy check data in the check cache based on a backup mode determined by the backup flag bit; during backup, sequentially generate a set of write commands; and send the set of write commands to the memory through the back end interface, and the memory is further configured to: back up the redundancy check data in the check cache to the backup area to be used in response to the set of write commands, where the redundancy check data includes redundancy check data belonging to garbage collection and/or redundancy check data generated from a write command of a host coupled with the memory controller.

It is to be noted that timing for sending the backup command by the host may be, but not limited to: sending an operating mode switching command or a reconstruction command to the memory controller, where the operating mode switching command includes at least one of: a stop start unit (SSU) mode switching command, a standby mode switching command, a write booster (WB) mode switching command; and the reconstruction command may include a command that a backup area that has stored redundancy check data needs to re-store the required redundancy check data due to a fault.

It is to be noted that the electronic device and the foregoing operating method for the memory controller belong to the same inventive concept. The electronic device includes the foregoing memory system. Therefore, the terms appearing here have all been explained in detail in the previous operating method and memory controller, and are also applicable here, and thus are not further described any more herein. It should be understood that only the structure most related to the technical solutions of the present application is described here. For the structure and description of the electronic device shown in FIG. 1, they are also included and applicable for the electronic device provided in the present disclosure. The electronic device also includes structures not shown but required for the normal operation of the electronic device, which, given the length of the application documents, are not further described in the present disclosure any more.

The foregoing is merely preferred implementations of the application but is not used to limit the protection scope of this disclosure.

The invention claimed is:

1. An operating method for a memory controller that is coupled with a memory, the memory comprising a user data pool and a system pool, the operating method comprising:

before performing a predefined operation, identifying redundancy check data in a check cache of the memory controller that needs to be backed up into the system pool;

upon a determination that a remaining capacity of a used L2 backup area is less than a size of L2 redundancy check data to be written and/or that a remaining capacity of a used garbage-collection (GC) backup area is less than a size of GC redundancy check data to be written, determining a backup area to be used from the system pool, wherein the used L2 backup area is a backup area in the system pool that has been used for backing up L2 redundancy check data generated from a write command of a host coupled with the memory controller, and the used GC backup area is a backup area in the system pool that has been used for backing up GC redundancy check data generated from garbage collection;

determining valid redundancy check data belonging to garbage collection in the used GC backup area; and backing up the valid redundancy check data into the backup area to be used, and erasing the used GC backup area, so as to use a same backup area to back up L2 redundancy check data and GC redundancy check data, thereby reducing a total size of backup areas in the system pool.

2. The operating method of claim 1, further comprising:

maintaining a backup management table, the backup management table being used for recording backup areas, that includes the backup area to be used, in use for storing redundancy check data.

3. The operating method of claim 2, wherein the maintaining the backup management table further comprises:

updating first management information corresponding to the backup area to be used into the backup management table; and deleting second management information corresponding to the used backup area from the backup management table, wherein the first management information includes at least first address information of the backup area to be used in the memory, and the second management information comprises at least second address information of the used backup area in the memory.

4. The operating method of claim 2, wherein the backup management table is stored in the memory controller and/or the memory.

5. The operating method of claim 1, further comprising:

setting a set backup flag bit to a first flag, wherein the backup flag bit is used for indicating a backup mode for the redundancy check data in the check cache of the memory controller, and when the backup flag bit is set to the first flag, the backup mode includes backing up all redundancy check data in the check cache to the backup area to be used.

6. The operating method of claim 5, wherein the backing up all redundancy check data in the check cache to the backup area to be used further comprises:

respectively traversing L2 redundancy check data in the check cache and GC redundancy check data in the check cache, and sequentially backing up the L2 redundancy check data in the check cache and the GC redundancy check data in the check cache to the backup area to be used.

7. The operating method of claim 5, wherein the operating method further comprises:

setting the backup flag bit to a second flag after the backup of all redundancy check data in the check cache is completed, wherein when the backup flag bit is set to the second flag, the backup mode comprises backing up redundancy check data in an updated state in the check cache to the backup area to be used.

8. The operating method of claim 1, wherein the determining valid redundancy check data belonging to garbage collection in the used GC backup area further comprises:

determining a valid data recording table of the used backup area; and determining the valid redundancy check data based on the valid data recording table.

9. A memory controller that is coupled with a memory, the memory comprising a user data pool and a system pool, the memory controller comprising a processor that is configured to:

before performing a predefined operation, identify redundancy check data in a check cache of the memory controller that needs to be backed up into the system pool;

upon a determination that a remaining capacity of a used L2 backup area is less than a size of L2 redundancy check data to be written and/or that a remaining capacity of a used garbage-collection (GC) backup area is less than a size of GC redundancy check data to be written, determine a backup area to be used from the system pool, wherein the used L2 backup area is a backup area in the system pool that has been used for backing up L2 redundancy check data generated from a write command of a host coupled with the memory controller, and the used GC backup area is a backup area in the system pool that has been used for backing up GC redundancy check data generated from garbage collection;

determine valid redundancy check data belonging to garbage collection in the used GC backup area; and back up the valid redundancy check data into the backup area to be used, and erase the used GC backup area, so as to use a same backup area to back up L2 redundancy check data and GC redundancy check data, thereby reducing a total size of backup areas in the system pool.

10. The memory controller of claim 9, wherein the processor is further configured to:

maintain a backup management table, the backup management table being used for recording backup areas, that comprise the backup area to be used, in use for storing redundancy check data.

11. The memory controller of claim 10, wherein the processor is further configured to:

update first management information corresponding to the backup area to be used into the backup management table; and delete second management information corresponding to the used backup area from the backup management table, wherein the first management information comprises at least first address information of the backup area to be used in the memory, and the second management information comprises at least second address information of the used backup area in the memory.

12. The memory controller of claim 9, wherein the memory controller is further configured to:

set a set backup flag bit to a first flag, wherein the backup flag bit is used for indicating a backup mode for the redundancy check data in the check cache, and when the backup flag bit is set to the first flag, the backup mode comprises backing up all redundancy check data in the check cache to the backup area to be used.

13. The memory controller of claim 12, wherein:

the memory controller further comprises a back end interface coupled with the memory and is further configured to respectively traverse L2 redundancy check data in the check cache and GC redundancy check data in the check cache, and sequentially generate a set of write commands, and send the set of write commands to the memory through the back end interface, and the memory is configured to back up the L2 redundancy check data in the check cache and the GC redundancy check data in the check cache to the backup area to be used in response to the set of write commands.

14. The memory controller of claim 12, wherein the processor is further configured to:

set the backup flag bit to a second flag after the backup of all redundancy check data in the check cache is completed, wherein when the backup flag bit is set to the second flag, the backup mode comprises backing up redundancy check data in an updated state in the check cache to the backup area to be used.

15. The memory controller of claim 9, wherein the processor is further configured to:

determine a valid data recording table of the used GC backup area; and determine the valid redundancy check data based on the valid data recording table.

16. A memory system, comprising:

a memory having a memory array, the memory array comprising a user data pool and a system pool; and a memory controller coupled with the memory and configured to control the memory;

wherein the memory controller comprises a processor that is configured to:

before performing a predefined operation, identify redundancy check data in a check cache of the memory controller that needs to be backed up into the system pool;

upon a determination that a remaining capacity of a used L2 backup area is less than a size of L2 redundancy check data to be written and/or that a remaining capacity of a used garbage-collection (GC) backup area is less than a size of GC redundancy check data to be written, determine a backup area to be used from the system pool, wherein the used L2 backup area is a backup area in the system pool that has been used for backing up L2 redundancy check data generated from a write command of a host coupled with the memory controller, and the used GC backup area is a backup area in the system pool that has been used for backing up GC redundancy check data generated from garbage collection;

determine valid redundancy check data belonging to garbage collection in the used GC backup area; and back up the valid redundancy check data into the backup area to be used, and erase the used GC backup area, so as to use a same backup area to back up L2 redundancy check data and GC redundancy check data, thereby reducing a total size of backup areas in the system pool.

17. The memory system of claim 16, wherein the processor is further configured to:

set a set backup flag bit to a first flag, wherein the backup flag bit is used for indicating a backup mode for redundancy check data in the check cache, and when the backup flag bit is set to the first flag, the backup mode comprises backing up all redundancy check data in the check cache to the backup area to be used.

18. The memory system of claim 16, wherein:

the memory controller further comprises a back end interface coupled with the memory;

the processor is further configured to respectively traverse L2 redundancy check data and GC redundancy check data in the check cache, and sequentially generate a set of write commands, and send the set of write commands to the memory through the back end interface; and the memory is further configured to back up the L2 redundancy check data and the GC redundancy check data in the check cache to the backup area to be used in response to the set of write commands.

19. The memory system of claim 16, wherein the memory system is contained in one of a solid state drive (SSD) and a memory card.

20. The memory system of claim 16, wherein the memory is a three-dimensional NAND Flash memory device.

* * * * *